United States Patent
Albert

(10) Patent No.: US 9,338,304 B2
(45) Date of Patent: May 10, 2016

(54) BIDIRECTIONAL COMMUNICATION SYSTEM AND METHOD FOR COMPENSATING FOR UNDESIRED FEEDBACK IN THE BIDIRECTIONAL COMMUNICATION SYSTEM

(75) Inventor: Elmar Albert, Rosenheim (DE)

(73) Assignee: Unify GmbH & Co. KG, Munich (DE)

( * ) Notice: Subject to any disclaimer, the term of this patent is extended or adjusted under 35 U.S.C. 154(b) by 128 days.

(21) Appl. No.: 14/125,746

(22) PCT Filed: Mar. 2, 2012

(86) PCT No.: PCT/EP2012/000957
§ 371 (c)(1),
(2), (4) Date: Dec. 12, 2013

(87) PCT Pub. No.: WO2013/127412
PCT Pub. Date: Sep. 6, 2013

(65) Prior Publication Data
US 2014/0185792 A1    Jul. 3, 2014

(51) Int. Cl.
*H04M 9/08* (2006.01)
*H04B 3/23* (2006.01)
*H04R 27/00* (2006.01)

(52) U.S. Cl.
CPC . *H04M 9/08* (2013.01); *H04B 3/23* (2013.01); *H04M 9/082* (2013.01); *H04R 27/00* (2013.01); *H04B 3/237* (2013.01)

(58) Field of Classification Search
None
See application file for complete search history.

(56) References Cited

U.S. PATENT DOCUMENTS

| | | | |
|---|---|---|---|
| 7,035,396 B1 * | 4/2006 | Ubowski et al. | 379/406.01 |
| 2006/0193466 A1 * | 8/2006 | Rodman | 379/406.06 |
| 2008/0021706 A1 * | 1/2008 | Bruwer | 704/233 |

FOREIGN PATENT DOCUMENTS

| | | |
|---|---|---|
| JP | 09130306 A | 5/1997 |
| WO | 03039115 A2 | 5/2003 |

OTHER PUBLICATIONS

Written Opinion of the International Searching Authority for PCT/EP2012/000957 dated Nov. 27, 2012 (Form PCT/ISA/237) (German Translation).
International Search Report for PCT/EP2012/000957 dated Nov. 27, 2012 (Forms PCT/ISA/220, PCT/ISA/210) (German Translation).

(Continued)

*Primary Examiner* — Simon Sing
*Assistant Examiner* — Jeffrey Lytle
(74) *Attorney, Agent, or Firm* — Buchanan Ingersoll & Rooney PC

(57) ABSTRACT

A bidirectional communication system includes—a first compensating unit to which a first output unit and a first input unit are assigned that is configured to compensate for undesired feedback from the first output unit in the first input unit with generation of first compensation data and at least one second compensating unit that is configured like the first compensating unit and is physically separate from the first compensating unit. The second compensating unit has a second output unit but no input unit is assigned to it. The first compensating unit and the second compensating unit are connected by interfaces via which the first compensation data generated by the first compensating unit can be sent to the second compensating unit so that second compensation data can be generated in the second compensating unit based on the first compensation data.

20 Claims, 4 Drawing Sheets

(56) References Cited

OTHER PUBLICATIONS

Reed, M.J. et al., "Acustic echo cancellation for stereophonic systems derived from pairwise panning of monophonic speech", IEE Proceedings: Vision, Image and Signal Processing, Institution of Electrical Engineers, GB, vol. 152, No. 1, Feb. 2005.

International Preliminary Report on Patentability for PCT/EP2012/000957 dated Sep. 12, 2014 (Form PCT/ISA/373) (English Translation).

International Preliminary Report on Patentability for PCT/EP2012/000957 dated Sep. 12, 2014 (Form PCT/ISA/373) (German Translation).

* cited by examiner

BIDIRECTIONAL COMMUNICATION SYSTEM AND METHOD FOR COMPENSATING FOR UNDESIRED FEEDBACK IN THE BIDIRECTIONAL COMMUNICATION SYSTEM

CROSS-REFERENCE TO RELATED APPLICATIONS

This application is the United States National Phase under 35 U.S.C. §371 of PCT International Patent Application No. PCT/EP2012/000957, filed on Mar. 2, 2012.

BACKGROUND OF THE INVENTION

1. Field of the Invention

Embodiments relate to a bidirectional communication system with compensation for undesired feedback as well as a method for compensating for undesired feedback in a bidirectional communication system.

2. Background of the Related Art

With bidirectional communication devices separated from each other by short or long distances, signals can be distorted in the transmission direction due to undesired feedback in the received signals sent by the output devices in the communication device to the input device(s) in the communication device. In cases where an output device and an input device are located in the same bidirectional communication device, compensation can take place in that device's compensating unit, so that distortion can be eliminated from the signal that is sent. However, if a signal sent from an output device of a bidirectional communication device that does not have an input device is coupled with an input device that is located in or assigned to a physically separated bidirectional communication device, this distortion cannot be eliminated from the signal sent by the affected bidirectional communication device.

To achieve compensation for undesired feedback in receiving systems, it is known how to have this compensation handled by a central unit to which all affected subsystems are connected. However, this is cumbersome and expensive.

BRIEF SUMMARY OF THE INVENTION

We provide a bidirectional communication system with compensation for undesired feedback as well as a method for compensating for undesired feedback in a bidirectional communication system, with which such undesired feedback can be easily and cost-effectively eliminated.

A sample application of this invention, described below, is a loudspeaker system or so-called speaker module, in which at least one compensating unit has only one speaker assigned as the output unit, and no microphone as the input unit. Obviously, the invention can also be used for any other configuration that has fewer microphones than speakers. It should also be understood that this invention applies not only to echo compensation in audio systems but also similarly to optical systems, for example, that have undesired feedback.

According to embodiments of the invention, a bidirectional communication system in which compensation for undesired feedback can occur comprises a first compensating unit as well as at least one second compensating unit, so two or multiple second compensating units. A first output unit and a first input unit are assigned to the first compensating unit, and it can compensate for undesired feedback from the first output unit to the first input unit by generating first compensation data and using them to compensate for the undesired feedback. Each second compensating unit is similar or identical to the first compensating unit and is physically separate from the first compensating unit. "Physically separate" means that there is a certain distance between the two compensating units, and these two units are not mounted on the same chip or card and connected to each other. Unlike the first compensating unit, each second compensating unit has only one output unit and no input units assigned to it. The invention is characterized in that both the first and at least one second compensating units are each connected to or equipped with an interface, through which the first compensation data generated by the first compensating unit can be sent to the at least one second compensating unit, so that second compensation data can be generated in the respective second compensating unit, allowing for compensation of any undesired feedback produced in the first input unit by the second output unit.

BRIEF DESCRIPTION OF THE DRAWINGS

Additional advantages, features, and characteristics of the invention are presented in the following detailed description of various embodiments of the invention. The figures show.

DETAILED DESCRIPTION OF THE INVENTION

Figure 1:
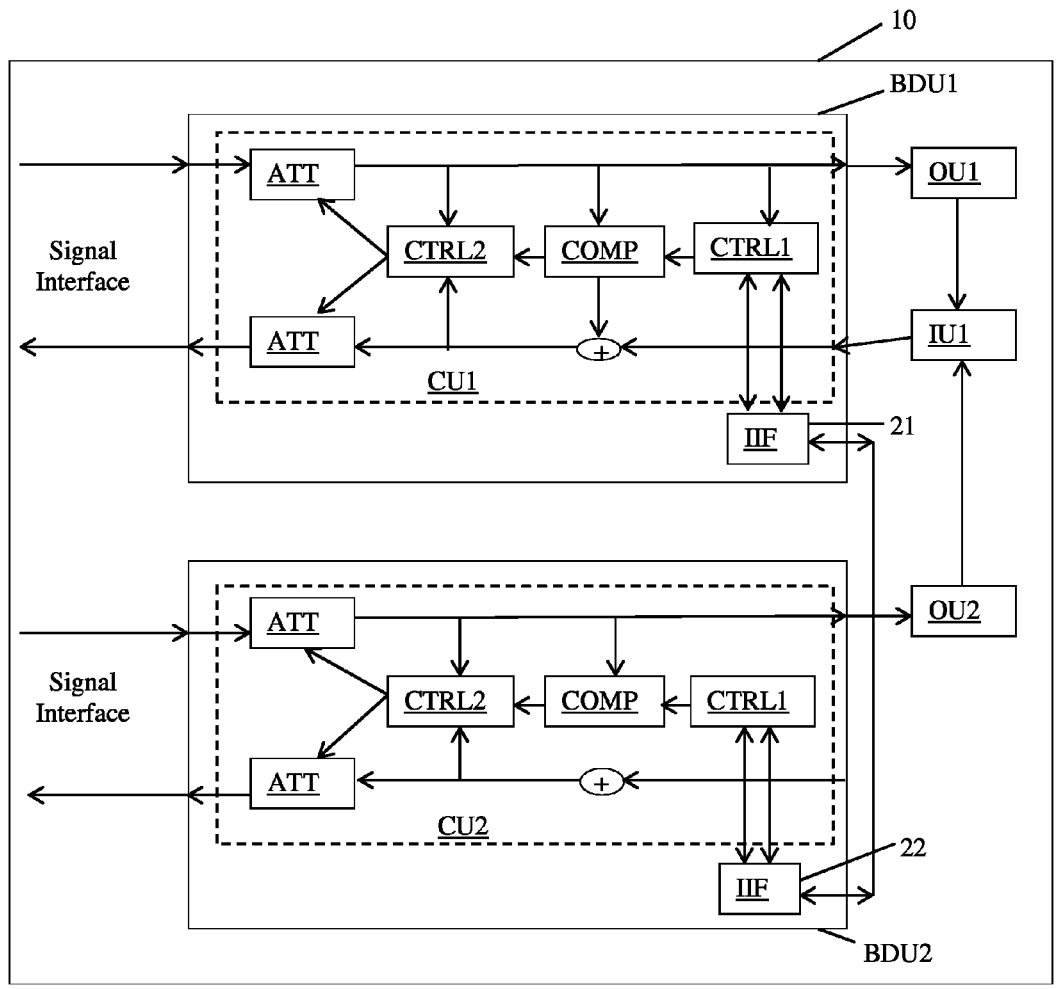
FIG. 1: a first embodiment of the invention.

With this type of bidirectional communication system, undesired feedback can be eliminated without having to take measures to eliminate these distortions outside of the communication system, on the system side for example. This solution is simple and cost-effective.

According to one advantageous embodiment of the invention, the first compensating unit is located in a first bidirectional communication device, such as a speaker system, and the one or each second compensating unit is located in a second bidirectional communication device that is physically separate from the first communication device. Even with systems separated in this way, it is still possible to ensure the trouble-free elimination of undesired feedback.

When the interface of the first compensating unit is used and configured not only for receiving the first compensation data but also for receiving control information, it can be advantageous if it can initiate compensation automatically. Here it can be especially beneficial to have compensation take place based on automatic pattern recognition of the signals in the first compensating unit. This automatic pattern recognition can also advantageously be done in a self-learning manner. In this way, compensation can be switched on and off based on automatic recognition of the existing situation in the first compensating unit. If a certain pattern occurs and is recognized in these signals, compensation can then be switched on. Alternatively, it is also possible to have compensation for undesired feedback be triggered by a corresponding preset or initiated control signal. This is useful, for example, in an audio system with physically separated individual speaker modules. Automatic switching can be extremely advantageous in cases where multiple speaker systems are located relatively close to each other and a variety of usage situations can occur, making it desirable to have flexible adaptability in the type and scope of compensation.

The two interfaces for exchanging or transferring and "feeding back" compensation data can be connected advantageously, on the one hand, with connection cables such as a standard CAT-5 cable for Ethernet use, USB, or an IOM-2 interface. On the other hand, this connection can also be wireless, using WLAN or DECT.

The invented method for compensating for undesired feedback in such a bidirectional communication system is characterized in that the first compensation data generated by the first compensating unit are sent directly via the respective interfaces to at least one second compensating unit, and in the at least one second compensating unit, second compensation data are generated to compensate for the undesired feedback from the second output unit to the first input unit. This allows for easy and cost-effective elimination of the feedback. The features and benefits described in relation to the bidirectional communication system also apply to the method and do not need to be described separately.

Because the aforementioned compensation and/or elimination of undesired feedback is done in a known manner, no detailed description of this process is necessary.

The bidirectional communication system according to the invention can be used, for example, in a trading system, like that used on the stock market to trade securities and derivatives. The invention can also be used in message centers for fire departments, police stations, and air traffic control sites.

For the following description of different embodiments of the invention, a speaker module is used as an example of the bidirectional communication system, although the invention obviously is not limited just to this application.

Figure 4:
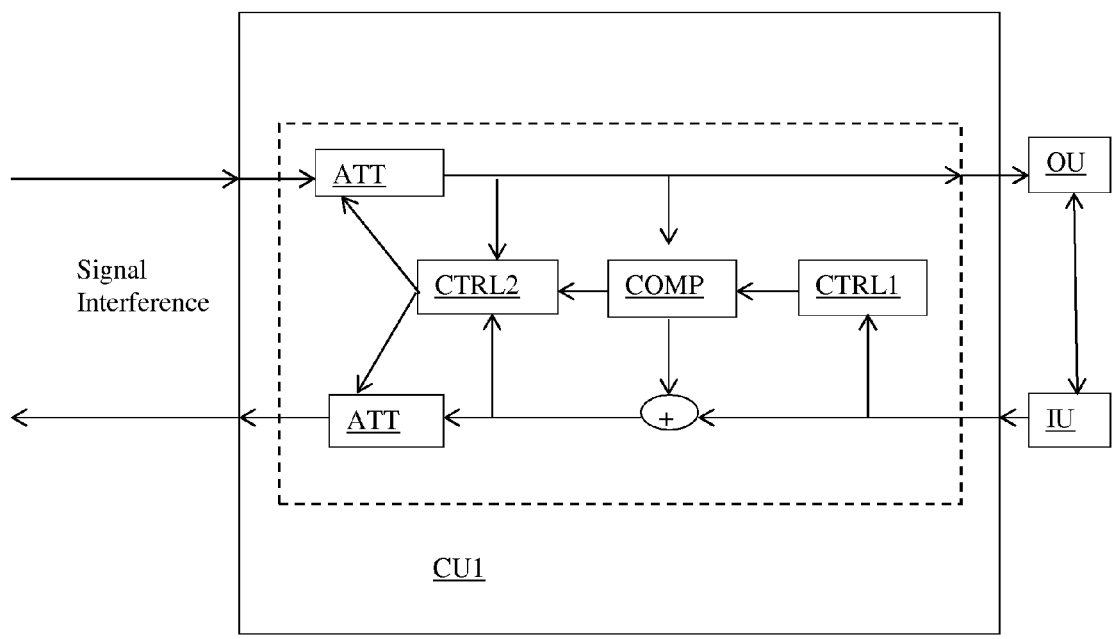
FIG. 4: a bidirectional communication system according to the prior art.

The first example assumes a speaker module known from the prior art and shown schematically in FIG. 4. A signal is fed via a signal interface into a compensating unit CU, which uses it to generate a signal for a speaker OU. The sound generated by the speaker OU can then reach a microphone IU of the speaker module and produce (undesired) feedback. This feedback is eliminated by the compensating unit CU in a known manner. If an additional speaker module that belongs to this bidirectional communication system has a speaker but no associated microphone, feedback caused by that speaker in the microphone IU of the compensating unit CU cannot be eliminated, because this speaker has no assigned microphone used for compensation.

According to the invention, compensation for undesired feedback in a bidirectional communication system 10, as shown in FIG. 1, is possible in the following manner. This bidirectional communication system 10 includes a first bidirectional communication device BDU1 and a second bidirectional communication device BDU2. The first communication device BDU1 contains a first compensating unit CU1, to which a first speaker OU1 and a first microphone IU1 are assigned. The second communication device BDU2 contains a second compensating unit CU2, to which a second speaker OU2 but no microphone is assigned.

The sound generated from both the first speaker OU1 and the second speaker OU2 reaches the first microphone IU1. The resulting feedback is compensated in the first compensating unit CU1 for the first communication device BDU1 by generating first compensation data and using them for the compensation. These first compensation data are sent to a first interface 21, which is located in the first communication device BDU1 and connected to the first compensating unit CU1. This first interface 21 consists of a interconnection interface IIF that is configured such that it can send the first compensation data to a second interface 22, which is similar or identical to the first interface 21 and is located in the second communication device BDU2 and connected to the second compensating unit CU2. The first compensation data sent to the second interface 22 can be used to generate second compensation data in the second compensating unit CU2, which can compensate for the feedback generated in the first microphone IU1 of the second speaker OU2. The connection between the two interfaces 21 and 22 is shown here only schematically and can be a wireless connection such as WLAN or DECT.

Figure 2:
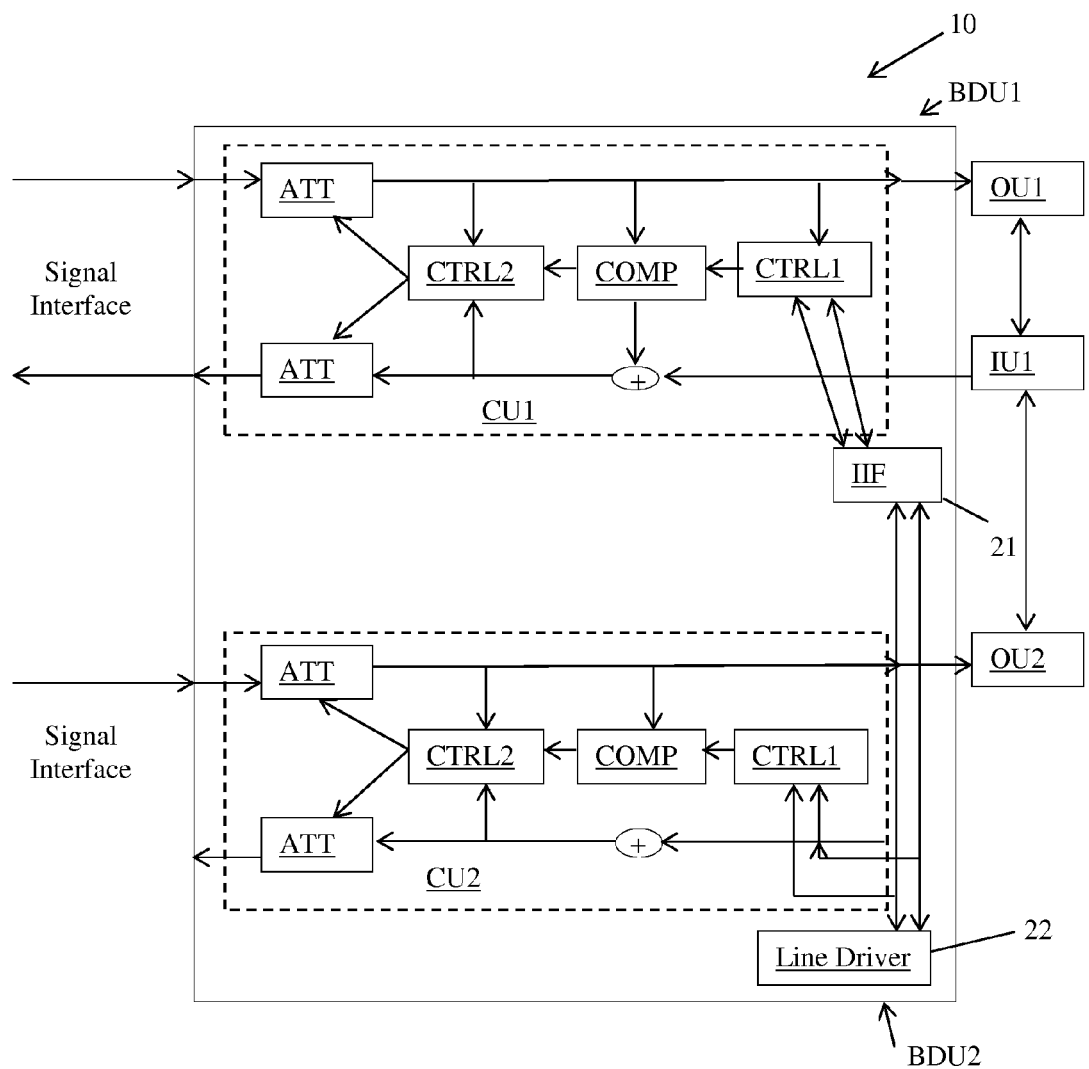
FIG. 2: a second embodiment of the invention.

In this way the feedback generated at the first microphone IU1 can be eliminated without corresponding steps having to be taken outside of the bidirectional communication system 10. A second embodiment of the invention is shown in FIG. 2. To prevent unnecessary repetition, in this second embodiment and the third embodiment, only the differences from the first embodiment are described, and similar or identical features or circuit units are designated with the same or similar references.

Unlike the first embodiment, the first communication device BDU1 is located in the same unit as the second communication device BDU2, although the two communication devices are designated separately. Alternatively, it is also possible for the first compensating unit CU1 and the second compensating unit CU2 to be housed in the same communication device. However, this does not affect the technical functionality of the invention. Unlike the first embodiment, in this second embodiment the second interface 22, differing from the first interface 21—which is configured with "smart" electronics and can be used to switch between compensation and non-compensation, for example—is configured with "dumb electronics" for establishing the connection to the first interface 21 and to the second compensating unit CU2 and functions as the driver for this connection or for switching. The undesired feedback at the microphone IU1 is compensated in the same way as for the first embodiment.

Figure 3:
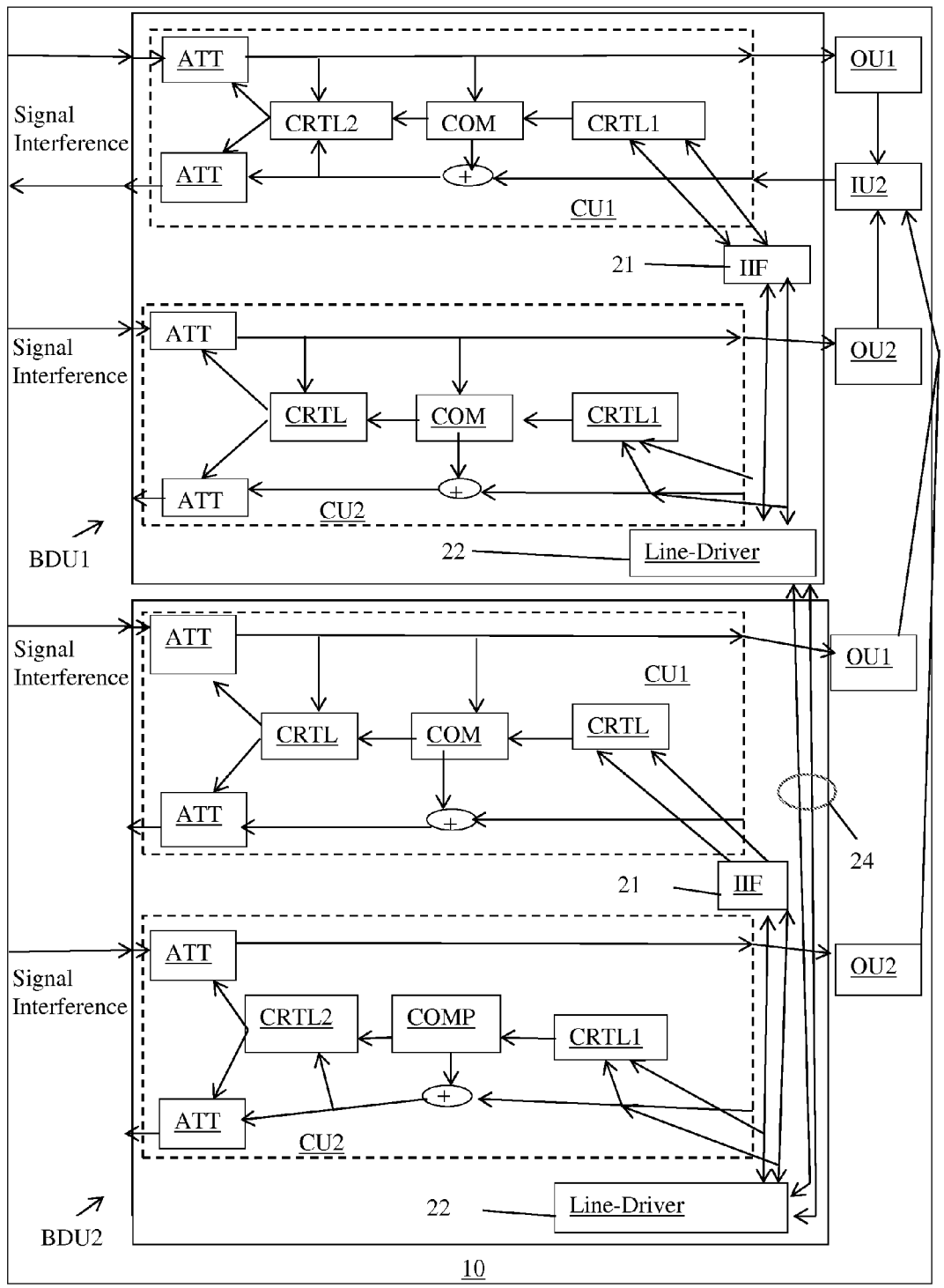
FIG. 3: a third embodiment of the invention.

FIG. 3 shows a third embodiment of the invention, in which a first communication device BDU1 has two compensating units CU1 and CU2 that are configured the same way as for the communication system 10 shown in FIG. 2.

Here, in addition, a second communication device BDU2 has two compensating units CU1 and CU2, each of which has only one speaker OU1 or OU2 assigned to it. The first compensating unit CU1 is connected to a first interface 21, while the second compensating unit CU2 is connected to a second interface 22. The two interfaces 21 and 22 are configured in the same way and connected as in the second embodiment. The second interface 22 for the second communication device BDU2 is connected to the second interface 22 for the first communication device BDU1 via an interconnection interface cable 24, which can be a standard CAT-5 cable, for example. Via the described connections, compensation data can be relayed to the first compensating unit CU1 of the first communication device BDU1, as well as the second compensating unit CU2 of that first communication device BDU1 and/or the two compensating units CU1 and CU2 of the second communication device BDU2, and used there to compensate for or eliminate feedback generated at the first microphone ILM of the first communication device BDU1 by the speaker OU2 of the first communication device BDU1 and the two speakers OLM and OU2 of the second communication device BDU2.

It is clear that additional embodiments of the invention are also possible, involving more speakers and/or more microphones than in the previously described embodiments, as long as every speaker does not have a microphone assigned to it. Feedback is always compensated in a known manner, preferably in components with a system-on-chip (SoC) configuration. These components generally consist of a control CPU and other on-chip-hardware as well as a digital signal processor (DSP). The functions of the compensating units described above are performed in the digital signal processor.

The described components, with system-on-chip configuration, can form an IOM-2 interface that can be used to connect signal paths between different SoCs. This interface also incorporates a protocol as well as the physical signal transfer. These IOM-2 interfaces can form part of an interface 21 (configured as an interconnection interface or IIF, for example) or 22. It should be noted that the features of the invention described by referencing the presented embodiments, for example the type and configuration of the interfaces and connections as well as the assignment of input and output units, can be present in other embodiments as well unless stated otherwise or prohibited for technical reasons.

I claim:

1. A bidirectional communication system with compensation for undesired feedback, comprising:
   a first compensating unit, to which a first output unit and a first input unit are assigned, said first compensating unit configured to compensate for undesired feedback from at least the first output unit received by the first input unit with generation of first compensation data that is generated by the first compensating unit to remove interference caused by the feedback from a transmitted signal received from the first input unit, and
   at least one second compensating unit physically separate from the first compensating unit, to which a second output unit but no input unit is assigned, wherein both the first compensating unit and the at least one second compensating unit are each connected with a separate interface, via which the first compensation data generated by the first compensating unit is sent to the at least one second compensating unit so that second compensation data is generated in the at least one second compensating unit based on the first compensation data to compensate for the undesired feedback produced in the first input unit by the second output unit.

2. The bidirectional communication system of claim 1, wherein the first compensating unit is located in a first bidirectional communication device and the second compensating unit is located in a second bidirectional communication device that is physically separate from the first communication device.

3. The bidirectional communication system of claim 1, wherein the interface of the first compensating unit is configured for receiving the first compensation data as well as control information, and is configured to initiate compensation automatically.

4. The bidirectional communication system of claim 3, wherein the first compensating device is configured so that compensation is automatically initiated by automatic pattern recognition of signals in the first compensating unit.

5. The bidirectional communication system of claim 4, wherein the first compensating device is configured so that compensation is self-learning.

6. The bidirectional communication system of claim 1, wherein the separate interfaces of the first and second compensating devices are connected to each other by a connection selected from the group consisting of connection cables, Ethernet cable, universal serial bus (USB) cable, an Integrated Services Digital Network-Oriented Modular Interface Revision 2 (IOM-2) interface cable, or via wireless local area network (WLAN) wireless connection, and a Digital Enhanced Cordless Telecommunications (DECT) wireless connection.

7. The bidirectional communication system of claim 1 wherein the bidirectional communication system is a speaker system, the first input unit is a microphone, and the system is configured for echo suppression.

8. A method for compensating for undesired feedback in a bidirectional communication system comprising:
   generating first compensation data with a first compensating unit, to which a first output unit and a first input unit are assigned;
   using the first compensation data by the first compensating unit to compensate for undesired feedback from at least the first output unit received in the first input unit with generation of first compensation data, and
   sending, by the first compensating unit, the first compensation data directly to at least one second compensating unit that is physically separate from the first compensating unit, a second output unit being assigned to the second compensating unit but no input unit is assigned to the second compensating unit;
   generating, in the at least one second compensating unit, second compensation data based on the first compensation data received from the first compensating unit to compensate for the undesired feedback generated by the second output unit at the first input unit.

9. The method of claim 8, wherein the second compensating unit is not associated with a microphone.

10. The method of claim 8, wherein the first input unit is a microphone and the first output unit is a speaker and wherein each second compensating unit is assigned to at least one speaker.

11. The method of claim 10, comprising:
    outputting audio from each speaker assigned to each second compensating unit such that the output audio does not include the undesired feedback removed via the generated second compensation data that was generated based on the first compensation data; and
    outputting audio from the speaker assigned to the first compensating unit that has the feedback removed via the generated first compensation data.

12. The method of claim 8, comprising:
    automatically recognizing a pattern of signals in the first compensating unit prior to generating the first compensation data; and
    automatically activating the generating of the first compensation data in response to the recognition of the pattern of signals.

13. The method of claim 12, wherein the first compensating unit performs the activating of the generating of the first compensation data.

14. The method of claim 13, comprising:
    switching off the generating of the first compensation data based on automatic recognition of an existing situation in the first compensating unit.

15. The method of claim 8, wherein the bidirectional communication system is in a message center or in a trading system.

16. The method of claim 8, comprising:
    receiving, by the first input unit, sound generated by the first and second output units, the feedback being at least partially defined from the sound of the first and second output units received by the first input unit.

17. The method of claim 16, wherein the first compensation data is generated to compensate for the feedback.

18. A communication system comprising:
    a first compensating unit assigned to a first output unit and a first input unit; and
    a second compensating unit assigned to a second output unit, the second compensating unit communicatively connected to the first compensating unit;
    the first compensating unit configured to compensate for feedback from the first output unit received by the first input unit by generating first compensation data to remove interference caused by that feedback from a transmission signal received from the first input unit;

the second compensating unit configured to receive the transmission signal from the first input unit and configured to receive the first compensation data from the first compensating unit to generate second compensation data based on the first compensation data to remove the feedback from the second output unit from the transmitted signal.

19. The communication system of claim 18, wherein the first compensating unit is configured to compensate for feedback from the first and second output units received by the first input unit to generate the first compensation data.

20. The communication system of claim 18, wherein the first compensating unit is configured to automatically detect a signal pattern to actuate generation of the first compensation data and transmit the generated first compensation data to the second compensating unit so that the first compensation data is usable by the second compensating unit to generate the second compensation data;

wherein the first compensating unit is physically separate from the second compensating unit and the first compensating unit is communicatively connected to the second compensating unit via a connection between a first interface of the first compensating unit and a second interface of the second compensating unit.

* * * * *